(12) United States Patent
Kwon et al.

(10) Patent No.: US 11,188,333 B2
(45) Date of Patent: Nov. 30, 2021

(54) DISPLAY DEVICE AND CONTROL METHOD THEREOF

(71) Applicant: SAMSUNG ELECTRONICS CO., LTD., Suwon-si (KR)

(72) Inventors: Jin-man Kwon, Daegu (KR); Chung-ki Woo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/646,321

(22) PCT Filed: May 16, 2018

(86) PCT No.: PCT/KR2018/005589
§ 371 (c)(1),
(2) Date: Mar. 11, 2020

(87) PCT Pub. No.: WO2019/066182
PCT Pub. Date: Apr. 4, 2019

(65) Prior Publication Data
US 2020/0285475 A1 Sep. 10, 2020

(30) Foreign Application Priority Data
Sep. 29, 2017 (KR) .......................... 10-2017-0126986

(51) Int. Cl.
*G06F 9/30* (2018.01)
*G06F 9/38* (2018.01)
*G09G 3/00* (2006.01)

(52) U.S. Cl.
CPC ........ *G06F 9/30145* (2013.01); *G06F 9/3016* (2013.01); *G06F 9/30043* (2013.01); *G06F 9/3802* (2013.01); *G09G 3/00* (2013.01)

(58) Field of Classification Search
CPC .. G06F 9/3802; G06F 9/30043; G06F 9/3016; G06F 9/3861; G06F 9/30145; G06F 11/07; G09G 3/00; G09G 3/20
See application file for complete search history.

(56) References Cited

U.S. PATENT DOCUMENTS 4,745,605 A * 5/1988 Goldman .............. G06F 9/3863
712/E9.061
5,889,975 A * 3/1999 Meyer ................... G06F 9/3802
712/219

(Continued)

FOREIGN PATENT DOCUMENTS

JP 10-063501 3/1998
JP 2011-053263 3/2011

(Continued)

OTHER PUBLICATIONS

International Search Report for PCT/KR2018/005589, dated Sep. 7, 2018, 4 pages.

(Continued)

*Primary Examiner* — Farley Abad
(74) *Attorney, Agent, or Firm* — Nixon & Vanderhye, P.C.

(57) ABSTRACT

Disclosed is a display apparatus including: a first memory configured to store a plurality of instructions to execute a program; a second memory; and a processor configured to load the plurality of instructions stored in the first memory to the second memory, based on execution of the program, sequentially fetch and decode the plurality of instructions loaded to the second memory, and reload a first instruction among the plurality of instructions stored in the first memory to the second memory based on the first instruction being identified as undecodable, and fetch and decode the reloaded first instruction.

13 Claims, 11 Drawing Sheets (56) References Cited

U.S. PATENT DOCUMENTS

| | | | |
|---|---|---|---|
| 2003/0056127 A1* | 3/2003 | Vaglica | G06F 1/3237 713/300 |
| 2010/0017580 A1* | 1/2010 | Greenhalgh | G06F 9/30167 712/205 |
| 2010/0325409 A1* | 12/2010 | Kim | G06F 9/4401 713/2 |

FOREIGN PATENT DOCUMENTS

| | | |
|---|---|---|
| KR | 10-2007-0050288 | 5/2007 |
| KR | 10-2007-0108936 | 11/2007 |
| KR | 10-2013-0053345 | 5/2013 |
| KR | 10-2016-0108754 | 9/2016 |
| KR | 10-2017-0067986 | 6/2017 |

OTHER PUBLICATIONS

Written Opinion of the ISA for PCT/KR2018/005589, dated Sep. 7, 2018, 5 pages.

\* cited by examiner

| Exception | Address |
|---|---|
| Reset | LR (Link Register) is not defined at reset |
| Data Abort | Pointing instruction causing Data Abort |
| FIQ | Return address from FIQ handler |
| IRQ | Return address from IRQ handler |
| SWI | Pointing next instruction of SWI |
| Undefined instruction | Pointing next instruction of 'Undefined instruction' |

DISPLAY DEVICE AND CONTROL METHOD THEREOF

TECHNICAL FIELD

This application is the U.S. national phase of International Application No. PCT/KR2018/005589 filed 16 May 2018, which designated the U.S. and claims priority to KR Patent Application No. 10-2017-0126986 filed 29 Sep. 2017, the entire contents of each of which are hereby incorporated by reference.

BACKGROUND ART

An operating system (OS) installed in a display apparatus is not read from a disk unlike that of a computer, but achieved by an embedded system provided as embedded in a built-in chip.

When a central processing unit (CPU) processes an instruction, the embedded system carries out processes of fetching, decoding and executing the instruction in a pipelining technique. During these processes, validation is checked to test whether the instruction is decodable, and many exceptions may occur.

When the exception occurs in decoding the instruction, an exception handling operation previously set for a type corresponding to the occurred exception among various types of exceptions is performed, and then an original code is returned.

However, when the exception is a type of 'undefined instruction', it is not a matter of a program but mostly caused by memory corruption such as a bit flip. In this case, the system generally crashes after carrying out the exception handling operation, and it may be thus inconvenient for a user because the system needs rebooting.

Further, a problem may arise in terms of the stability of the system if the undefined instruction frequently occurs.

SUMMARY

Accordingly, an aspect of the disclosure is to provide a display apparatus and a control method thereof, in which a system is prevented from crashing when it is impossible to decode an instruction due to memory corruption or the like.

Further, another aspect of the disclosure is to provide a display apparatus and a control method thereof, in which an originally intended instruction is restored when it is impossible to decode an instruction due to memory corruption or the like.

According to an embodiment of the disclosure, there is provided a display apparatus including: a first memory configured to store a plurality of instructions to execute a program; a second memory; and a processor configured to load the plurality of instructions stored in the first memory to the second memory, based on execution of the program, sequentially fetch and decode the plurality of instructions loaded to the second memory, and reload a first instruction among the plurality of instructions stored in the first memory to the second memory based on the first instruction being identified as undecodable, and fetch and decode the reloaded first instruction.

According to such an embodiment of the disclosure, it is possible to prevent the system from suddenly crashing when an instruction is not decodable due to memory corruption or the like. Further, an originally intended instruction is restored, thereby normally executing the program.

The processor may reload a line portion corresponding to the first instruction from the first memory to the second memory, based on the first instruction being identified as undecodable among the plurality of instructions. Thus, when an instruction due to memory corruption or the like is not decodable, it is possible to normally execute the program by restoring only the line including the corresponding instruction in a cache memory.

The processor may create a clone of the plurality of instructions loaded to the second memory based on the first instruction being identified as undecodable among the plurality of instructions, identify whether the clone matches the plurality of instructions loaded to the second memory, and reload the plurality of instructions stored in the first memory to the second memory based on a mismatch. Thus, when it is impossible to decode an instruction due to memory corruption or the like, it is possible to eliminate a probability of new memory corruption by examining all the instructions as well as a line including the corresponding instruction in the cache memory.

The processor may stop executing the program based on the clone matching the plurality of instructions loaded to the second memory. Thus, when the undecodable instruction is not caused by the memory corruption, it is regarded as a problem of the program and it is possible to stop executing the system.

The processor may sequentially carry out a plurality of exception handling operations, which includes reloading the stored first instruction to the second memory, based on the first instruction being identified as undecodable among the plurality of instructions. Thus, when the undecodable instruction is caused by the memory corruption, the preset exception handling operation is carried out together with the restoring process for the instruction, thereby stably executing the system.

The processor may stop executing the program based on the first instruction being identified as undecodable among the plurality of instructions. Thus, when the instruction is not decodable, it is possible to stop executing the system immediately as necessary and provide debugging information to a developer.

The display apparatus may further include an input receiver configured to receive a user input, wherein the processor sets one of a plurality of instruction examination modes based on the received user input, and identifies a method of comparing the first instruction loaded to the second memory with the first instruction stored in the first memory based on the set mode based on the first instruction being identified as undecodable among the plurality of instructions. Thus, an examination method set by a product developer is applied to the undecodable instruction, thereby accomplishing more reliable examination.

The processor may set bounds of the plurality of instructions loaded to the second memory, which will be compared with the clone, based on a user input. Thus, in an early stage of product development, examination bounds desired by a developer is set with regard to the undecodable instruction, thereby achieving reliable examination.

According to an embodiment of the disclosure, there is provided a computer program product including: a memory configured to store a plurality of program instructions; and a processor, the program instruction, when executed by the processor, including: loading the plurality of instructions stored in the first memory to the second memory, based on execution of the program; sequentially fetching and decoding the plurality of instructions loaded to the second memory; and reloading a first instruction stored in the first memory to the second memory when it is identified that the first instruction among the plurality of instructions is not decodable; and fetching and decoding the reloaded first instruction.

According to such an embodiment of the disclosure, it is possible to prevent the system from suddenly crashing when an instruction is not decodable due to memory corruption or the like. Further, an originally intended instruction is restored, thereby normally executing the program.

The program instruction may include: creating a clone of the plurality of instructions loaded to the second memory, based on the first instruction being identified as undecodable among the plurality of instructions; identifying whether the clone matches the plurality of instructions loaded to the second memory; and reloading the plurality of instructions stored in the first memory to the second memory based on a mismatch. Thus, when it is impossible to decode an instruction due to memory corruption or the like, it is possible to eliminate a probability of new memory corruption by examining all the instructions as well as a line including the corresponding instruction in the cache memory.

According to an embodiment of the disclosure, there is provided a method of controlling a display apparatus including a first memory configured to store a plurality of instructions to execute a program, and a second memory, the method including: loading the plurality of instructions stored in the first memory to the second memory, based on execution of the program; sequentially fetching and decoding the plurality of instructions loaded to the second memory; and reloading a first instruction among the plurality of instructions stored in the first memory to the second memory based on the first instruction being identified as undecodable; and fetching and decoding the reloaded first instruction.

According to such an embodiment of the disclosure, it is possible to prevent the system from suddenly crashing when an instruction is not decodable due to memory corruption or the like. Further, an originally intended instruction is restored, thereby normally executing the program.

The method may further comprise reloading a line portion corresponding to the first instruction from the first memory to the second memory, based on the first instruction being identified as undecodable among the plurality of instructions. Thus, when an instruction due to memory corruption or the like is not decodable, it is possible to normally execute the program by restoring only the line including the corresponding instruction in a cache memory.

The method may further include: creating a clone of the plurality of instructions loaded to the second memory based on the first instruction being identified as undecodable among the plurality of instructions; identifying whether the clone matches the plurality of instructions loaded to the second memory; and reloading the plurality of instructions stored in the first memory to the second memory based on a mismatch. Thus, when it is impossible to decode an instruction due to memory corruption or the like, it is possible to eliminate a probability of new memory corruption by examining all the instructions as well as a line including the corresponding instruction in the cache memory.

The method may further include stopping executing the program based on the clone matching the plurality of instructions loaded to the second memory. Thus, when the undecodable instruction is not caused by the memory corruption, it is regarded as a problem of the program and it is possible to stop executing the system.

The method may further include sequentially carrying out a plurality of exception handling operations, which includes reloading the stored first instruction to the second memory, based on the first instruction being identified as undecodable among the plurality of instructions. Thus, when the undecodable instruction is caused by the memory corruption, the preset exception handling operation is carried out together with the restoring process for the instruction, thereby stably executing the system.

The method may further include stopping executing the program based on the first instruction being identified as undecodable among the plurality of instructions. Thus, when the instruction is not decodable, it is possible to stop executing the system immediately as necessary and provide debugging information to a developer.

The method may further include: receiving a user input; setting one of a plurality of instruction examination modes based on the received user input; and identifying a matching method between the first instruction loaded to the second memory and the first instruction stored in the first memory based on the set mode based on the first instruction being identified as undecodable among the plurality of instructions. Thus, an examination method set by a product developer is applied to the undecodable instruction, thereby accomplishing more reliable examination.

The method may further include setting bounds of the plurality of instructions loaded to the second memory, which will be compared with the clone, based on a user input. Thus, in an early stage of product development, examination bounds desired by a developer is set with regard to the undecodable instruction, thereby achieving reliable examination.

Advantageous Effects

As described above, according to the disclosure, a system is prevented from suddenly crashing when it is impossible to decode an instruction due to memory corruption or the like, thereby having effects on achieving a stable system.

Further, according to the disclosure, an originally intended instruction is restored when it is impossible to decode an instruction due to memory corruption or the like, thereby normally operating a program.

DETAILED DESCRIPTION OF EXAMPLE EMBODIMENTS

Below, embodiments of the disclosure will be described in detail with reference to accompanying drawings so as to be easily realized by a person having ordinary skill in the art. The disclosure may be achieved in various different forms and not limited to the embodiments set forth herein.

Figure 1:
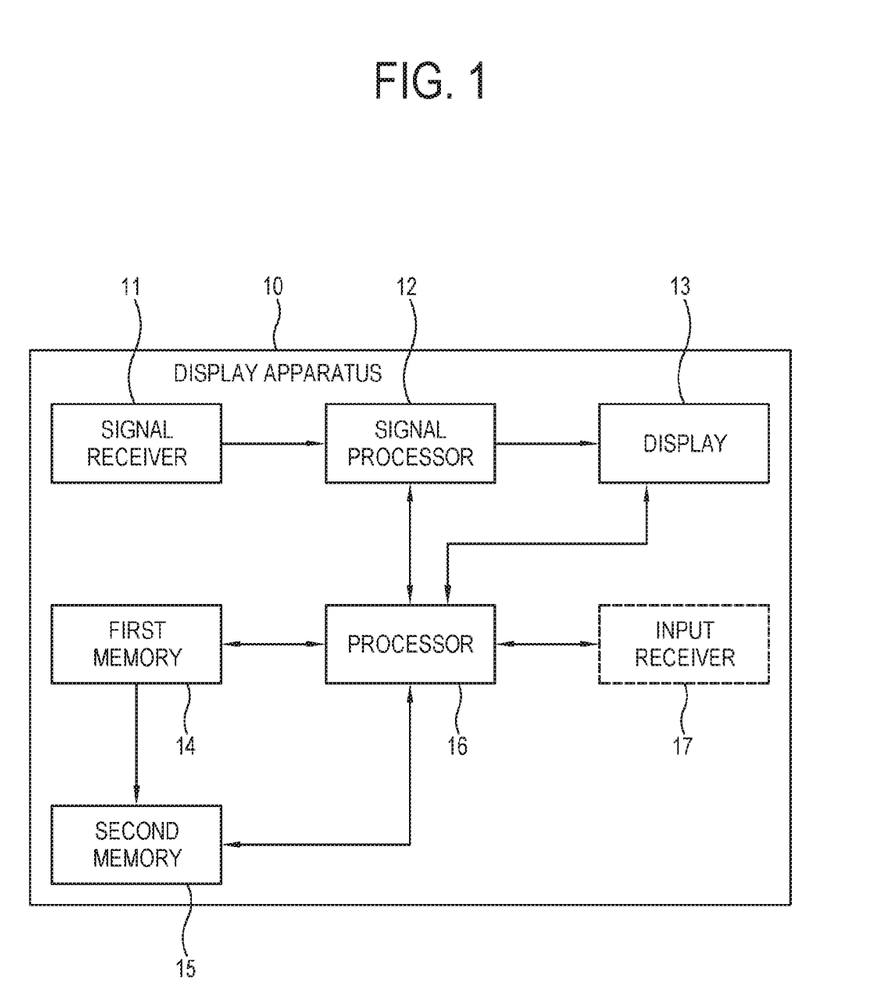
FIG. 1 is a block diagram showing a configuration of a display apparatus according to an embodiment of the disclosure.

FIG. 1 is a block diagram showing a configuration of a display apparatus according to an embodiment of the disclosure. As shown in FIG. 1, a display apparatus 10 of the disclosure includes a signal receiver 11, a signal processor 12, a display 13, a first memory 14, a second memory 15, and a processor 16, and may further include an input receiver 17. The display apparatus 10 may for example be achieved by a television (TV), a mobile device, a tablet computer, a personal computer (PC), etc. The elements included in the display apparatus 10 is not limited to the foregoing embodiment of the disclosure, but may exclude some elements or include other additional elements.

To provide a plurality of achievable functions, the display apparatus 10 executes a program corresponding to each function. In this case, the display apparatus 10 needs to process an instruction for executing the program. However, an exception may occur while processing the instruction.

The display apparatus 10 with the foregoing configuration according to the disclosure may perform a process to prevent a system from crashing with regard to an 'undefined instruction' among exceptions that may occur while processing an instruction.

The signal receiver 11 receives an image signal or a broadcast signal from the outside. The image signal may for example include a video or graphic signal. The signal receiver 11 may be provided in various forms according to the standards of the received image signal and the types of the display apparatus 10. For example, the signal receiver 11 may be achieved by a tuner for receiving a radio frequency (RF) broadcast signal or satellite signal transmitted from a broadcasting station. Alternatively, the signal receiver 11 may receive an image signal from a digital versatile disc (DVD) player, a game console, a PC, or the like a high definition multimedia interface (HDMI) device.

The signal processor 12 performs a preset signal processing process with regard to an image signal or broadcast signal received from the signal receiver 11. As examples of the signal processing performed in the signal processor 12, there are demultiplexing, decoding, de-interlacing, scaling, noise reduction, detail enhancement, etc. without limitations. The signal processor 12 may be achieved as a system on chip (SOC) where many functions are integrated, or as individual elements for independently performing each process.

The display 13 displays an image based on an image signal processed by the signal processor 12. There are no limits to the types of the display 13, and the display 13 may be achieved in various types such as a plasma display panel (PDP), a liquid crystal display (LCD), an organic light emitting diode (OLED), a flexible display, etc.

The first memory 14 may be achieved by a nonvolatile memory such as a flash memory to retain data regardless of whether the display apparatus 10 is powered on or off.

The first memory 14 is configured to store a plurality of instructions for executing a program. The first memory 14 performs reading, writing, edition, deleting, updating, etc. with respect to each of the plurality of stored instructions.

The second memory 15 refers to a high-speed buffer memory provided between the first memory 14 and the processor 16, and is also called a cache memory or a local memory. The second memory 15 is faster than the flash memory and directly accessible by the processor 16. The second memory 15 refers to a storage in which data or a program instruction frequently accessed by the processor 16 is stored to be immediately used without repetitive retrieval, and may for example be achieved by a random access memory (RAM). In this embodiment, the second memory 15 is achieved by a separate element, but this is merely an example. Alternatively, the second memory 15 may for example be integrated into the processor 16.

The input receiver 17 receives a user's input for controlling at least one function of the display apparatus 10. For example, the input receiver 17 may receive a user's input for selecting a part of a user interface (UI) displayed on the display 13. The input receiver 17 may be achieved in the form of an input panel provided outside the display apparatus 10, or may be achieved by a remote controller that communicates with the display apparatus 10 through infrared light. Further, the input receiver 17 may be achieved by a keyboard, a mouse or the like connected to the display apparatus 10, and may be achieved by a touch screen provided in the display apparatus 10.

The processor 16 performs a control process for controlling the plurality of functions provided in the display apparatus 10. The processor 16 may be achieved by a CPU, and includes three areas of control, operation and register. In the control area, a program instruction is decoded, and the elements of the display apparatus 10 are instructed to operate according to meaning of a decoded command. In the operation area, arithmetic operation and logic operation are performed, and operation needed for operating the elements of the display apparatus is performed as instructed in the control area. The register refers to a storage in which pieces of information needed while the CPU executes an instruction are stored, and which stores the instructions and data for the elements of the display apparatus 10 and stores operation results.

The processor 16 loads the plurality of instructions stored in the first memory 14 to the second memory 15 when a program for carrying out a certain function of the display apparatus 10 is executed.

The processor 16 fetches and decodes the plurality of instructions loaded to the second memory 15. When there are no problems with the plurality of instructions during such a decoding process, each instruction is executed to normally proceed with the program.

When an exception occurs with regard to an instruction while decoding the plurality of instructions, the processor 16 performs an exception handling operation previously set with regard to each type of exception.

The exception of an 'undefined instruction' type may for example be caused when the instruction is not decodable due to memory corruption such as a bit flip. In this case, if the operation according to an embodiment of the disclosure is not performed, the system may crash without returning to the original instruction after carrying out the exception handling operation.

To prevent this, the processor 16 reloads the first instruction stored in the first memory 14 to the second memory 15 when the first instruction is identified as the undefined instruction while decoding the plurality of instructions.

The display apparatus 10 includes system software, i.e. an operating system (OS), and the OS may for example be stored in the first memory 14 and loaded into the second memory 15 when executed. The processor 16 may perform operations of executing the OS, and fetching, decoding and executing each of the plurality of instructions of the program supported by the OS.

The processor 16 may for example execute an exception handler to perform the exception handling operation when an exception occurs with regard to an instruction while decoding the instruction.

The exception handler refers to software for handling an exception when the exception occurs, and may be achieved as included in the processor 16 or separately from the processor 16.

The exception handler performs a plurality of exception handling operations previously set with respect to many types of exceptions that occur while decoding the instruction.

However, when the exception of the 'undefined instruction' type occurs while decoding the instruction, the exception handling operation has not been set with regard to the exception of the 'undefined instruction' type, and thus the exception handler directly process this exception, thereby causing the system to crash.

To prevent this, the exception handler notifies the OS that the 'undefined instruction' and the like exception that is not directly processable by the exception handler occurs, so that the OS can process the corresponding exception.

The OS processes the exception and feeds the process result to the exception handler of the processor 16, thereby allowing the processor 16 to carry out the subsequent operation.

As described above, even though the exception is not processable in the exception handler of the processor 16, it is possible to prevent the system from crashing by the method of restoring the original instruction through the OS.

Below, the exception handling using the OS according to an embodiment of the disclosure will be described in detail. For convenience of description, the operations of the processor 16 carried out by executing the OS or the exception handler may be simply described as the operations of the processor 16 as necessary without mentioning the OS or the exception handler.

Figure 2:
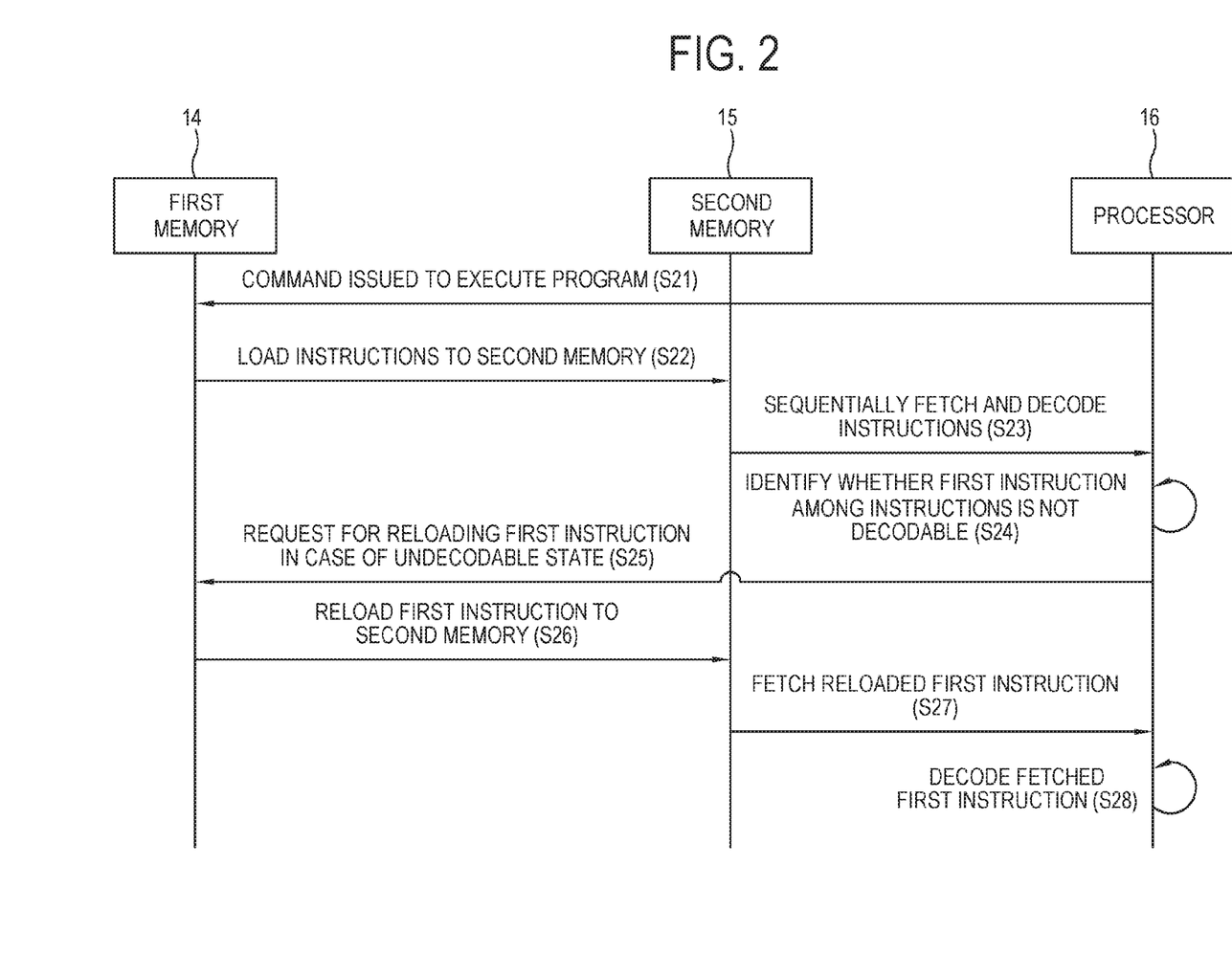
FIG. 2 is a flowchart showing an example of processing an undecodable instruction in a normal processing mode according to an embodiment of the disclosure.

Specifically, the processor 16 may process the 'undefined instruction' in the normal processing mode as shown in FIG. 2.

First, when a command is issued to execute the program stored in the first memory 14 at operation S21, at operation S22 the plurality of instructions stored in the first memory 14 are loaded into the second memory 15. The loading of the instructions from the first memory 14 to the second memory 15 may be directly controlled by the processor 16 or may be controlled by a separate memory controller additionally provided in the display apparatus 10.

Next, at operation S23, the processor 16 sequentially fetches the plurality of instructions from the second memory 15, and decodes each fetched instruction.

At operation S24, the processor 16 identifies whether the first instruction among the plurality of instructions is not decodable, during the decoding process.

In this case, when the first instruction is not decodable, the processor 16 transmits a request for reloading the first instruction to the first memory 14 at operation S25, and reloads the first instruction stored in the first memory 14 to the second memory 15 at operation S26.

Next, the processor 16 fetches the first instruction reloaded into the second memory 15 at operation S27, and decodes the fetched first instruction again at operation S28. Thus, when there are no problems with the first instruction reloaded during the decoding process, the first instruction is normally executed.

As described above, according to an embodiment of the disclosure, when it is impossible to decode an instruction due to memory corruption or the like, an originally intended instruction is restored to thereby normally execute the program.

Figure 3:
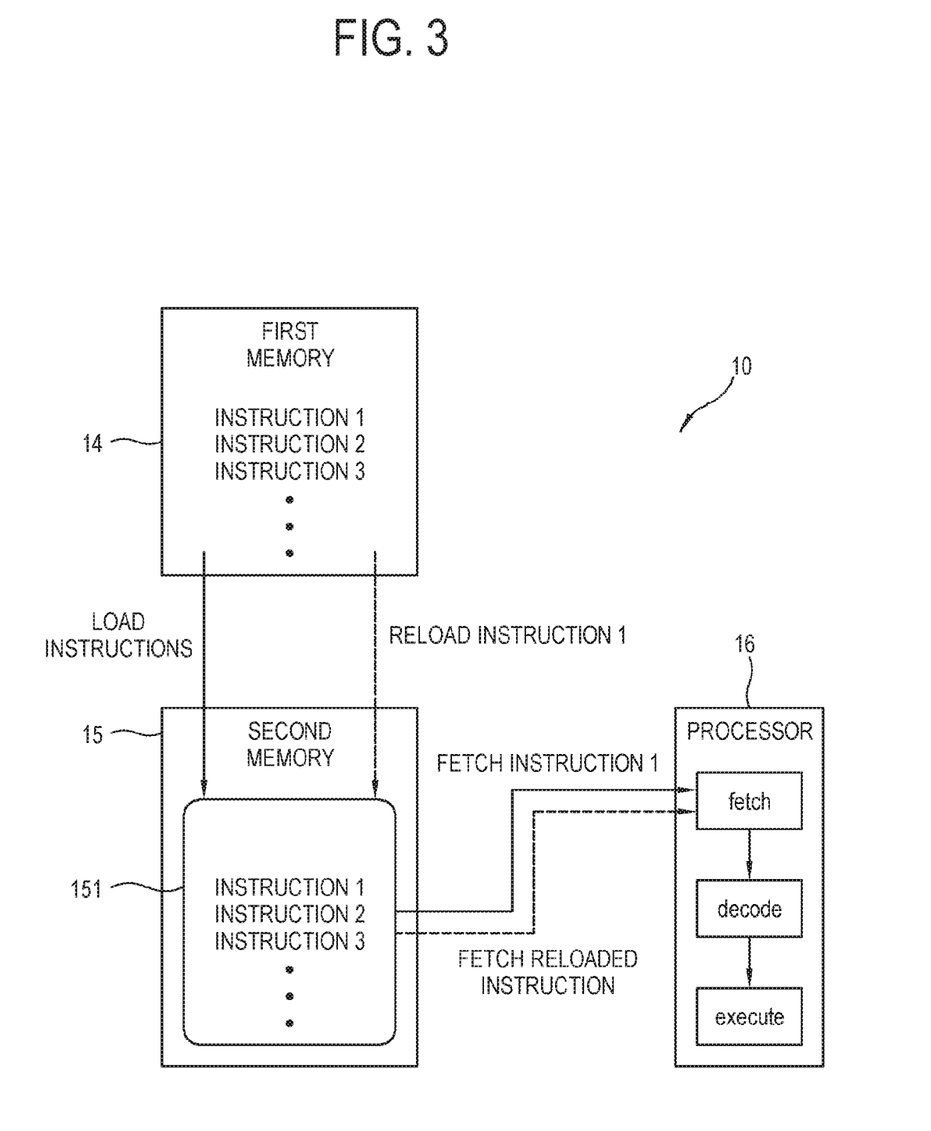
FIG. 3 illustrates an example of an interface between elements for processing an instruction in a normal processing mode according to an embodiment of the disclosure.

FIG. 3 illustrates an example of an interface between elements for processing an instruction in a normal processing mode according to an embodiment of the disclosure. As shown in FIG. 3, in the display apparatus 10 according to the disclosure, when a program for providing a certain function is executed, the plurality of instructions stored in the first memory 14 to execute the program is loaded to the second memory 15.

In this case, the processor 16 sequentially fetches the plurality of instructions 151 loaded to the second memory 15, i.e. a first instruction INSTRUCTION 1, a second instruction INSTRUCTION 2, a third instruction INSTRUCTION 3, and so on.

According to an embodiment, the processor 16 fetches the first instruction, and decodes and executes the fetched first instruction. In this case, when the 'undefined instruction' or the like exception occurs while decoding the first instruction, preset exception handling is performed.

In this case, the processor 16 involves a process for restoring the original first instruction in handling the exception. To this end, the processor 16 reloads the originally stored first instruction from the first memory 14 to the second memory 15. For example, the processor 16 may reload only a line portion corresponding to the first instruction from the first memory 14 to the second memory 15.

Thus, the processor 16 fetches again and decodes the first instruction reloaded to the second memory 15, and executes the first instruction when the exception does not occur during the decoding process.

Figure 4:
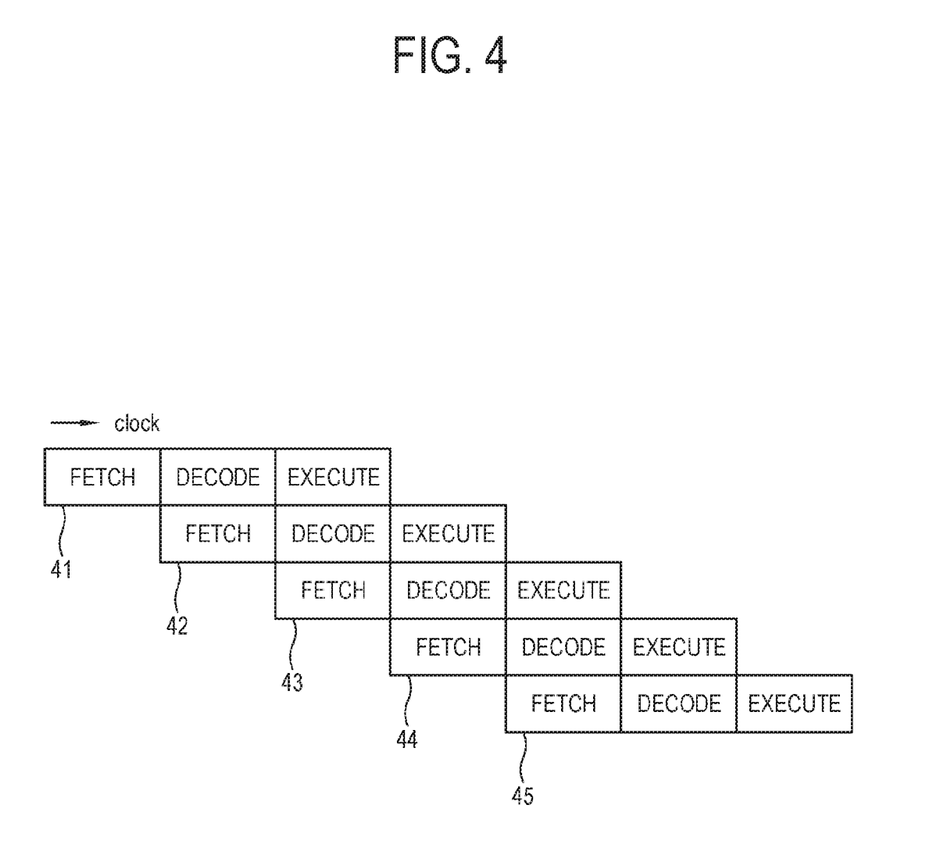
FIG. 4 illustrates processes in which a processor processes a plurality of instructions according to an embodiment of the disclosure.
Figure 5:
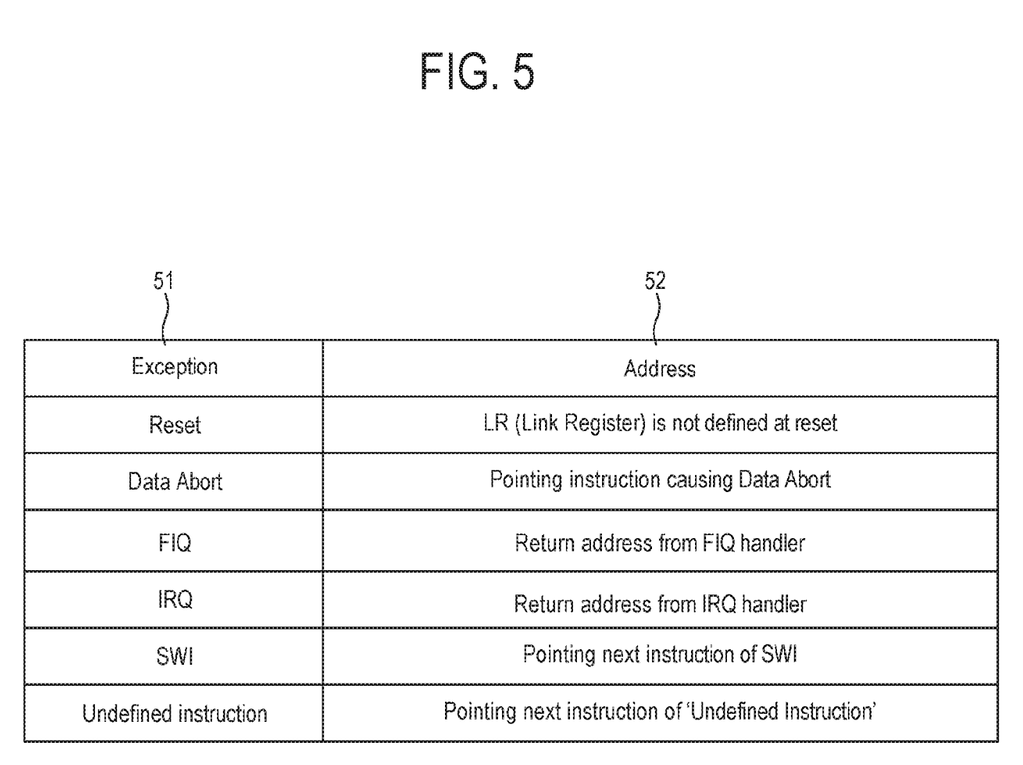
FIG. 5 is a table in which various types of exception that occur in a process of decoding an instruction are tabulated according to an embodiment of the disclosure the instruction.
Figure 6:
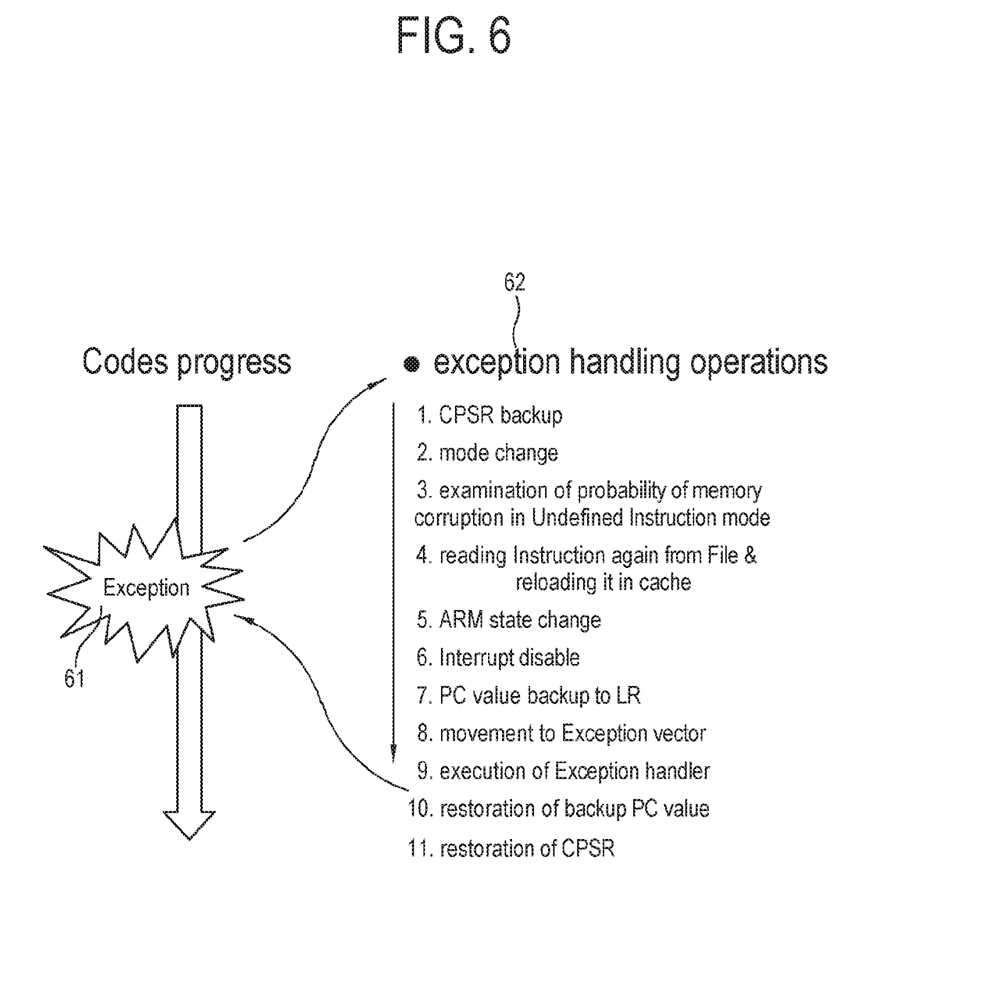
FIG. 6 illustrates an example of carrying out an exception handling operation according to an embodiment of the disclosure when it is impossible to decode an instruction.

Referring to FIGS. 4 to 6, a method of handing the exception, which occurs with regard to an instruction in the display apparatus 10 according to the disclosure, will be described.

In the example shown in FIG. 4, the processor 16 first fetches a first instruction 41 among a plurality of instructions, which are loaded from the first memory 14 to the second memory 15, from the second memory 15, and decodes and executes the fetched first instruction 41. In this case, a second instruction 42 is fetched while decoding the first instruction 41, and decoded while executing the first instruction 41.

Likewise, a third he instruction 43, a fourth instruction 44 and a fifth instruction 45 are also subjected to fetching, decoding and executing processes in sequence leaving a predetermined period of time.

Like this, the plurality of instructions for executing the program are sequentially processed in a pipelining technique, thereby having an efficiency higher than that of when the plurality of instructions are simultaneously processed.

FIG. 5 is a table in which various types of exception that occur in a process of decoding an instruction are tabulated according to an embodiment of the disclosure the instruction. According to the disclosure, when an exception 51 occurs while a plurality of instructions are sequentially fetched from the second memory 15 and decoded, the processor 16 carries out exception handling operations previously set according to the types of exception.

According to an embodiment, when the processor 16 may for example be achieved by Advanced RISC Machines (ARM), many types of exception 51, such as 'Reset', 'Data Abort', 'Fast Interrupt reQuest (FIQ)', 'Interrupt ReQuest (IRQ)', 'SoftWare Interrupt (SWI)', and 'Undefined Instruction' as shown in the table, may occur.

For example, 'Reset' exceptions occur when power is on or reset, and 'Data Abort' exceptions occur when an invalid address is accessed or when the instruction is not fetched. Further, 'FIQ' exceptions occur due to a fast interrupt request, and 'IRQ' exceptions occur due to hardware interrupt request. 'Undefined Instruction' exceptions occur when the instruction is not decodable during the decoding process, are generally encountered when memory corruption occur, or otherwise occur when debugging is enabled by intentionally inserting an unused code.

When the exception 51 occurs as described above, the processor 16 stops the operation and performs the exception handling operation by jumping to an address 52 set for the corresponding type.

FIG. 6 illustrates an example of carrying out an exception handling operation according to an embodiment of the disclosure when an instruction is not decodable. As shown in FIG. 6, the processor 16 performs a plurality of exception handling operations 62 when an exception 61 corresponding to 'Undefined Instruction' occurs while decoding the first instruction fetched from the second memory 15.

The illustrated example shows the plurality of exception handling operations 62 with regard to the 'Undefined Instruction' when the processor 16 is achieved by the ARM. For example, the plurality of exception handling operations 62 includes current program status register (CPSR) backup, mode change corresponding to an exception type, memory corruption check, instruction reloading to a cache, Arm state change, interrupt disable, program counter (PC) value backup to link register (LR), move to an exception vector, exception handler execution, PC value restoration, and CPSR restoration, which are carried out in sequence.

The exception handling operations as described above may be varied depending on the types of the processor 16, and may additionally include or exclude some operations.

Figure 7:
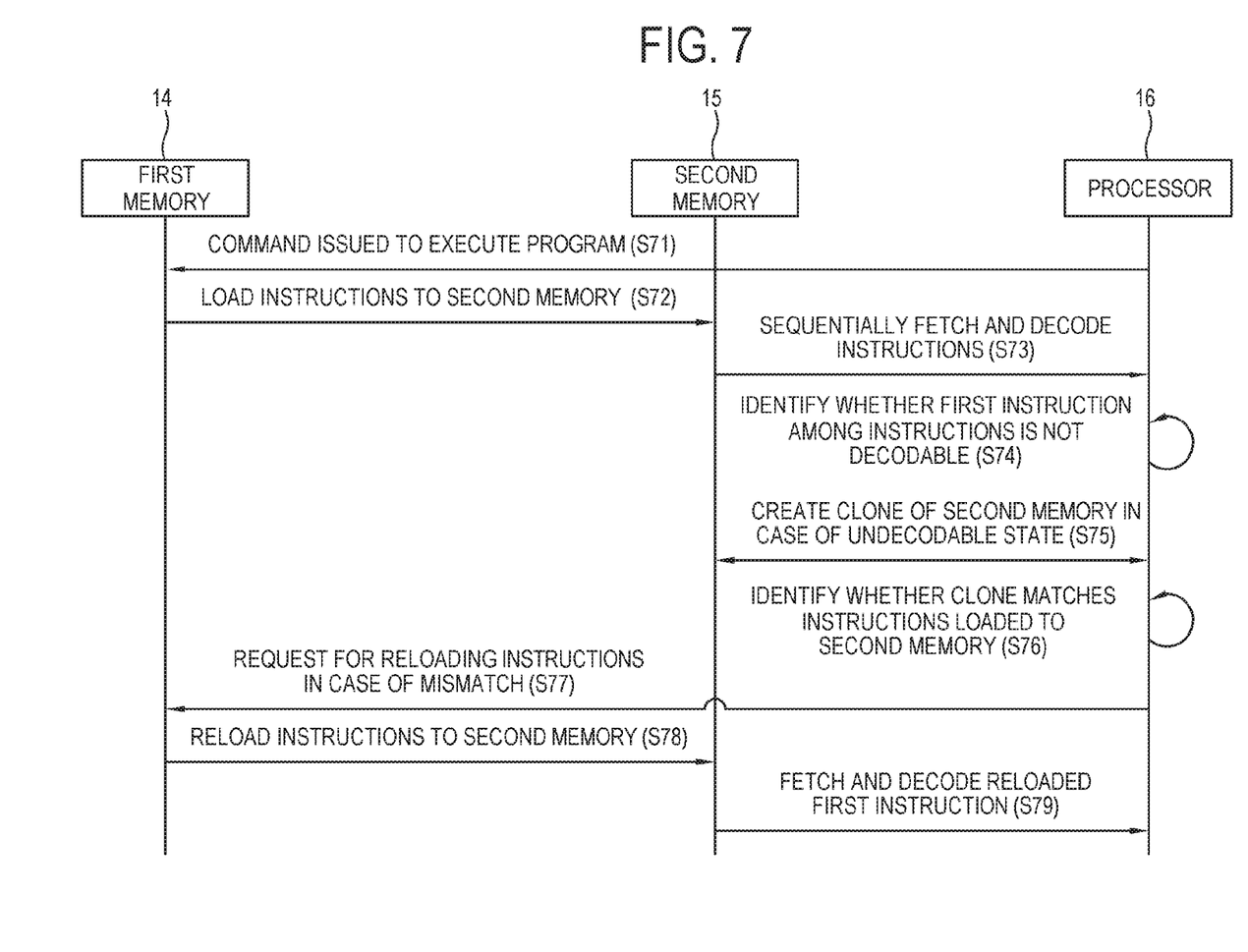
FIG. 7 is a flowchart showing an example of processing an undecodable instruction in a reliability processing mode according to an embodiment of the disclosure.

FIG. 7 is a flowchart showing an example of processing an undecodable instruction in a reliability processing mode according to an embodiment of the disclosure. As shown in FIG. 7, the processor 16 of the disclosure may enter a reliability processing mode with regard to the 'undefined instruction' exception that occurs while decoding the instruction.

First, when a command is issued to execute the program with regard to the first memory 14 at operation S71, the processor 16 loads the plurality of instructions stored in the first memory 14 into the second memory 15 at operation S72.

Next, at operation S73, the processor 16 sequentially fetches the plurality of instructions from the second memory 15, and decodes each fetched instruction.

At operation S74, the processor 16 identifies whether the first instruction among the plurality of instructions is not decodable, during the decoding process.

In this case, when the first instruction is not decodable, at operation S75 the processor 16 creates a clone (see '152' in FIG. 8) of the plurality of instructions (see '151' in FIG. 8) loaded to the second memory 15. Here, the clone 152 of the plurality of instructions 151 loaded to the second memory 15 is created to identify whether the exception that occurs with regard to the first instruction is caused by memory corruption.

Next, at operation S76, the processor 16 identifies whether the clone 152 matches the plurality of instructions 151 loaded to the second memory 15. When the clone 152 does not match the plurality of instructions 151, at operation S77, the processor 16 transmits a request for reloading the plurality of instructions to the first memory 14.

Thus, at operation S78 the plurality of instructions stored in the first memory 14 is reloaded to the second memory 15.

Next, at operation S79 the processor 16 fetches the first instruction among the plurality of instructions reloaded into the second memory 15, and decodes the fetched first instruction again. Thus, when there are no problems with the first instruction reloaded during the decoding process, the first instruction is normally executed.

As described above, according to an embodiment of the disclosure, when it is impossible to decode an instruction due to memory corruption or the like, not only the corresponding instruction but also all the instructions are fully examined, thereby improving reliability and preventing memory corruption that may newly occur.

Figure 8:
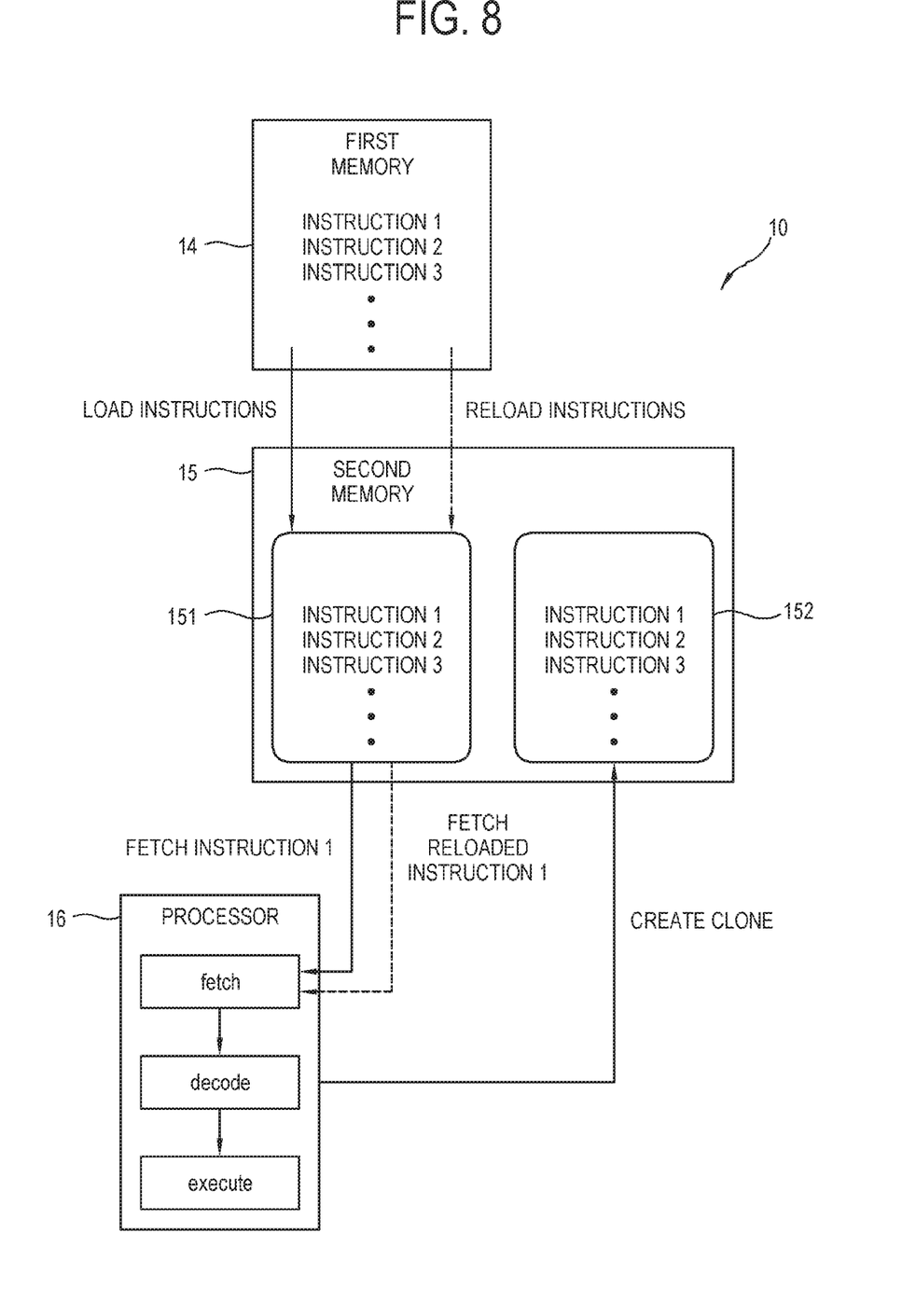
FIG. 8 illustrates an example of an interface between elements for processing an instruction in a reliability processing mode according to an embodiment of the disclosure.

FIG. 8 illustrates an example of an interface between elements for processing an instruction in a reliability processing mode according to an embodiment of the disclosure. As shown in FIG. 8, in the display apparatus 10 according to the disclosure, when a program for providing a certain function is executed, the plurality of instructions stored in the first memory 14 to execute the program is loaded to the second memory 15.

In this case, the processor 16 sequentially fetches the plurality of instructions 151 loaded to the second memory 15, i.e. a first instruction INSTRUCTION 1, a second instruction INSTRUCTION 2, a third instruction INSTRUCTION 3, and so on.

According to an embodiment, the processor 16 fetches the first instruction, and decodes and executes the fetched first instruction. In this case, when the 'undefined instruction' or the like exception occurs while decoding the first instruction, preset exception handling is performed.

In this case, the processor 16 involves a process for restoring the original first instruction in handling the exception. To this end, the processor 16 creates the clone 152 of the plurality of instructions 151 loaded to the second memory 15.

To additionally examine whether there are no problems with all the plurality of instructions as well as the first instruction with which the exception occurs, the processor 16 compares the plurality of instructions 151 loaded to the second memory 15 with the newly created clone 152.

In result of comparison, when the plurality of instructions 151 does not match the clone 152, that is, when there is a mismatch between any instruction and the clone 152, the processor 16 reloads all the plurality of instructions stored in the first memory 14 to the second memory 15. In this case, it may be identified that the exception occurred with the first instruction is caused by memory corruption, and measures may be carried out by previously identifying whether a problem of memory corruption can arise even in instructions other than the first instruction.

On the other hand, in result of comparison, when the plurality of instructions 151 matches the clone 152, that is, when the whole instructions are the same as the clone 152, the processor 16 stops executing the program. In this case, it may be identified that the exception occurred with the first instruction is caused by not the memory corruption but the program's own error or the like.

Thus, the processor 16 fetches again and decodes the first instruction among the plurality of instructions reloaded to the second memory 15, and executes the first instruction when no exceptions occur during the decoding process.

Figure 9:
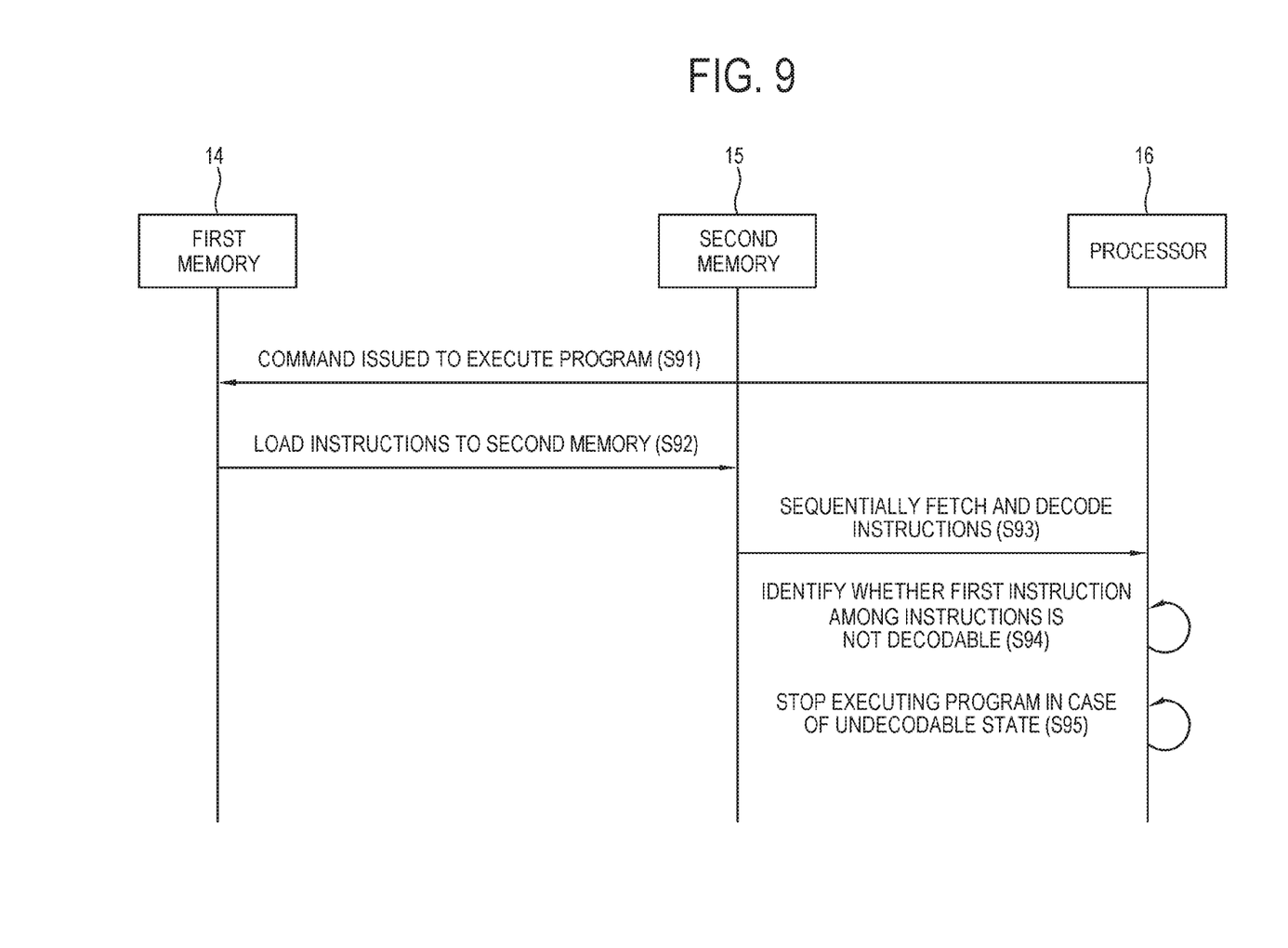
FIG. 9 is a flowchart showing an example of processing an undecodable instruction in a fast processing mode according to an embodiment of the disclosure.

FIG. 9 is a flowchart showing an example of processing an undecodable instruction in a fast processing mode according to an embodiment of the disclosure. As shown in FIG. 9, the processor 16 may enter a fast processing mode with regard to the 'undefined instruction' exception.

First, when a command is issued to execute the program with regard to the first memory 14 at operation S91, the processor 16 loads the plurality of instructions stored in the first memory 14 into the second memory 15 at operation S92.

Next, at operation S93, the processor 16 sequentially fetches the plurality of instructions from the second memory 15, and decodes each fetched instruction.

the processor 16 identifies whether the first instruction among the plurality of instructions is not decodable, during the decoding process, at operation S94, and stops executing the program at operation S95 when the first instruction is not decodable.

As described above, according to an embodiment of the disclosure, when it is impossible to decode an instruction, the program may be stopped immediately as necessary and debugging information may be provided to a developer.

Figure 10:
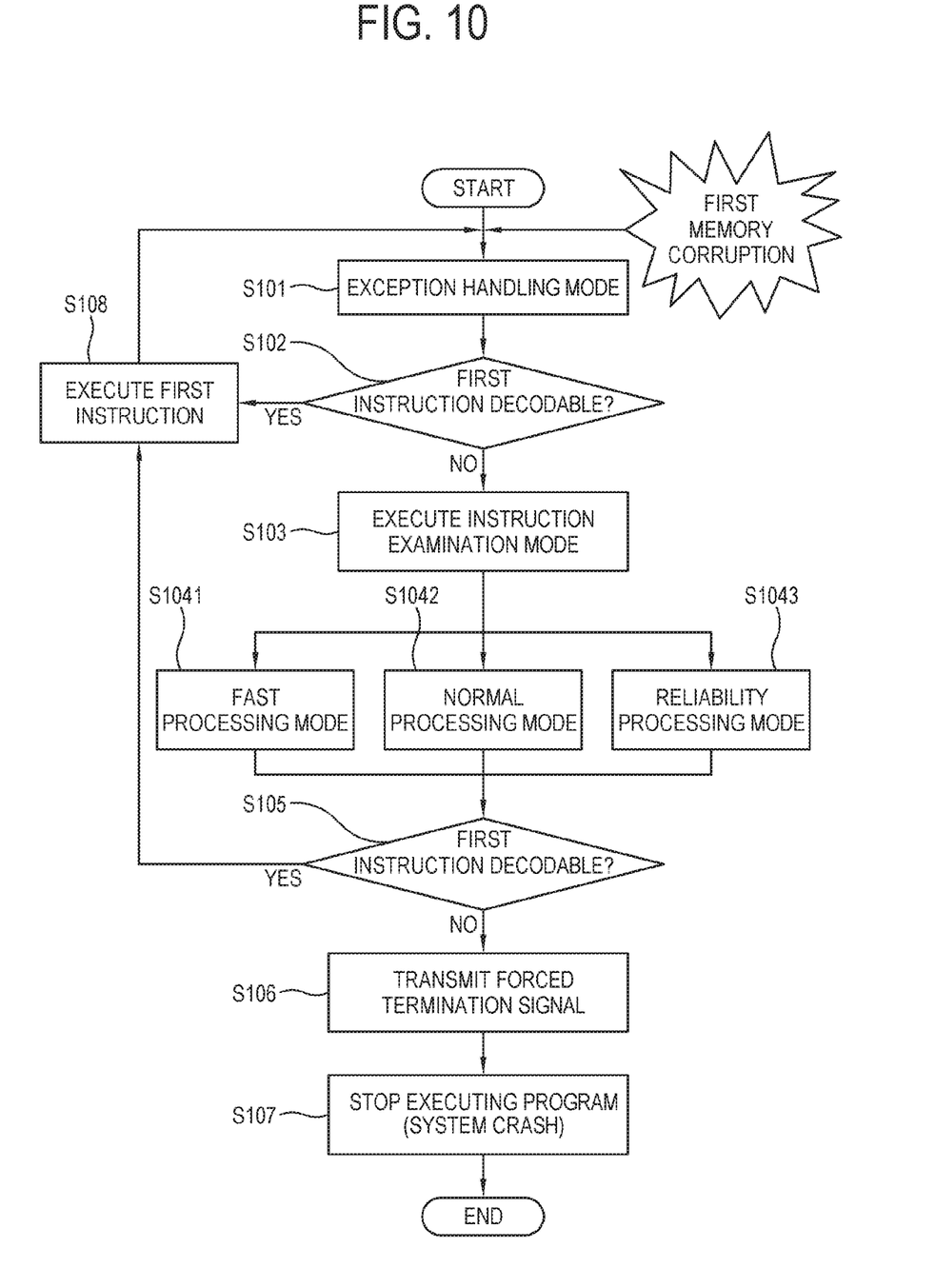
FIG. 10 is a flowchart showing an example of processing an undecodable instruction in a set examination mode according to an embodiment of the disclosure.

FIG. 10 is a flowchart showing an example of processing an undecodable instruction in a set examination mode according to an embodiment of the disclosure. First, at operation S101, when an exception occurs due to corruption of the first memory 14, an exception handling mode starts. In this case, a plurality of exception handling operations set according to the types of exception is performed.

At operation S102, the processor 16 identifies whether the first instruction is decodable while the plurality of instructions loaded to the second memory 15 are fetched and decoded. In result of identification, when the first instruction is decodable, at operation S108 the first instruction is executed.

On the other hand, in result of identification, when the first instruction is not decodable, at operation S103 an instruction examination mode starts. Here, the instruction examination mode may be previously set by a user, or set through a UI displayed on a screen when the exception occurs.

According to the instruction examination mode set as described above, the normal processing mode (see FIGS. 2 and 3) may be performed at operation S1042 or the reliability processing mode (see FIGS. 7 and 8) may be performed at operation S1043. Further, the fast processing mode (see FIG. 9) may be performed at operation S1041.

Next, when the instruction examination mode is completed, it is identified again at operation S105 whether the first instruction is decodable. In this case, when the first instruction is decodable, at operation S108 the first instruction is executed.

However, when the first instruction is not decodable even though the instruction examination mode has been executed, at operation S106 a forced termination signal is transmitted. Thus, at operation S107 the execution of the program is stopped.

Figure 11:
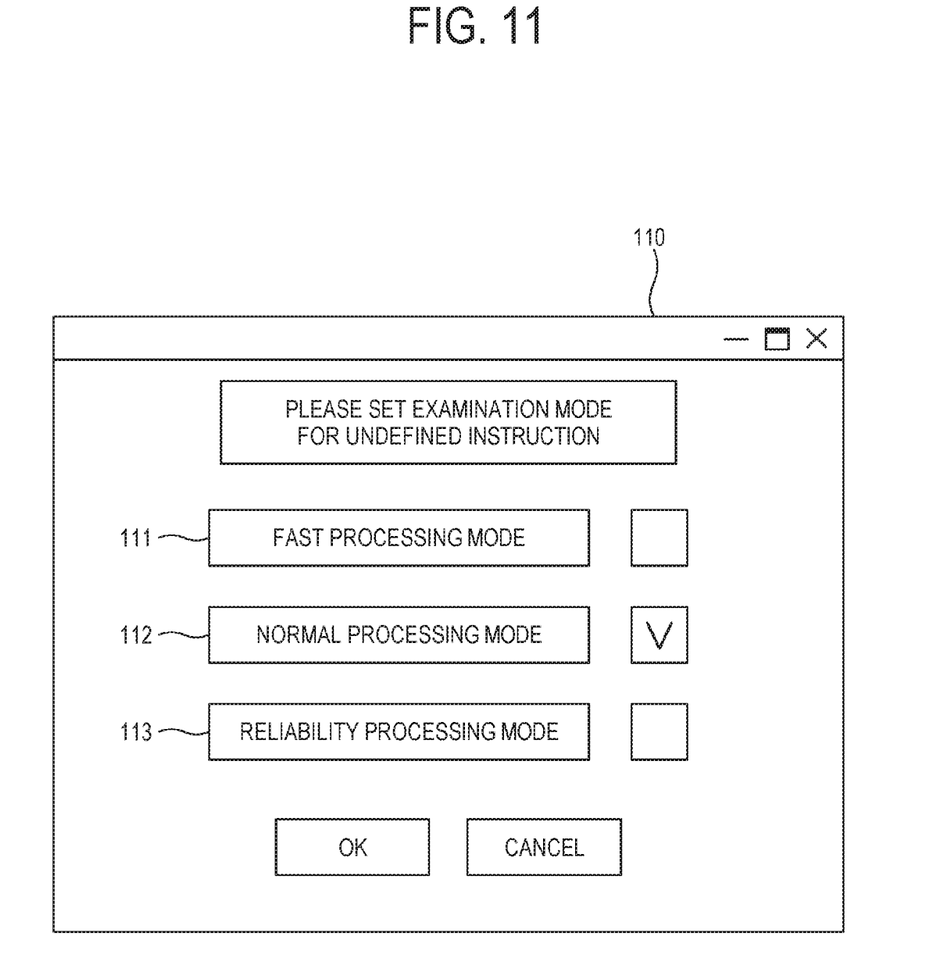
FIG. 11 illustrates an example of a user interface (UI) through which an examination mode for an undecodable instruction is set according to an embodiment of the disclosure.

FIG. 11 illustrates an example of a UI through which an examination mode for an undecodable instruction is set according to an embodiment of the disclosure. As shown in FIG. 11, the display apparatus 10 of the disclosure allows a user to set an instruction examination mode in person with regard to an instruction, which is not decodable as an exception occurs due to memory corruption.

For example, the display apparatus 10 may display an examination mode setting UI 110 for the 'undefined instruction' on the display 13. A user may select one of three examination modes, i.e. a fast processing mode 111, a normal processing mode 112 and a reliability processing mode 113 by putting a check mark through the examination mode setting UI 110.

In this case, when the 'undefined instruction' exception occurs with regard to the first instruction under the condition that a user selects and sets the normal processing mode 112, the first instruction stored in the first memory 14 is reloaded according to the preset normal processing mode 112. Thus, the original first instruction is restored, and the program is normally run.

Further, when the 'undefined instruction' exception occurs with regard to the first instruction under the condition that a user selects and sets the reliability processing mode 113, the clone 152 of the plurality of instructions 151 loaded to the second memory 15 is created according to the preset reliability processing mode 113, and the plurality of instructions stored in the first memory 14 are all reloaded when there is a mismatch between any instruction and the clone 152. Thus, the original first instruction is restored, and exceptions are less likely to occur with regard to other instructions.

When the 'undefined instruction' exception occurs with regard to the first instruction under the condition that a user selects and sets the fast processing mode 111, it may be possible to immediately stop executing the program and provide debugging information to the user.

According to an embodiment, the display apparatus 10 may set bounds for comparison with the plurality of instructions stored in the first memory 14 among the plurality of instructions loaded to the second memory 15, according to the user's input to the additional UI (not shown) displayed on the screen.

For example, in terms of comparison between the clone 152 and the plurality of instructions 151 loaded to the second memory, a user may use the UI (not shown) to set whether all the plurality of instructions are subjected to the comparison, or only the first instruction causing the exception and a predetermined number of instructions surrounding the first instruction are subjected to the comparison.

As described above, according to an embodiment of the disclosure, an examination method and examination bounds set by a product developer may be applied to the undecodable instruction, thereby accomplishing more reliable examination.

Although exemplary embodiments of the disclosure have been described in detail, the disclosure is not limited to these embodiments and various changes may be made within the appended claims.

What is claimed is:

1. A display apparatus comprising:
a first memory configured to store a plurality of instructions to execute a program;
a second memory; and
a processor configured to:
load the plurality of instructions stored in the first memory to the second memory, based on execution of the program,
sequentially fetch and decode the plurality of instructions loaded to the second memory, and
while sequentially fetching and decoding the plurality of instructions, based on a first instruction among the plurality of instructions being identified as undecodable, create a clone corresponding to the plurality of instructions,
identify whether the clone matches the plurality of instructions loaded to the second memory, and
reload the plurality of instructions stored in the first memory to the second memory based on a mismatch.

2. The display apparatus according to claim 1, wherein the processor is configured to reload a line portion corresponding to the first instruction from the first memory to the second memory, based on the first instruction being identified as undecodable among the plurality of instructions.

3. The display apparatus according to claim 1, wherein the processor is configured to stops executing the program based on the clone matching the plurality of instructions loaded to the second memory.

4. The display apparatus according to claim 1, wherein the processor is configured to sequentially carry out a plurality of exception handling operations, which comprises reloading the stored first instruction to the second memory, based on the first instruction being identified as undecodable among the plurality of instructions.

5. The display apparatus according to claim 1, wherein the processor is configured to stops executing the program based on the first instruction being identified as undecodable among the plurality of instructions.

6. The display apparatus according to claim 1, wherein the processor is configured to set bounds of the plurality of instructions loaded to the second memory, which will be compared with the clone, based on a user input.

7. A display apparatus comprising:
an input receiver configured to receive a user input;
a first memory configured to store a plurality of instructions to execute a program;
a second memory; and
a processor configured to:
load the plurality of instructions stored in the first memory to the second memory, based on execution of the program,
sequentially fetch and decode the plurality of instructions loaded to the second memory, and
reload a first instruction among the plurality of instructions stored in the first memory to the second memory based on the first instruction being identified as undecodable, and fetch and decode the reloaded first instruction, wherein the processor is further configured to:
set one of a plurality of instruction examination modes based on the received user input, and
identify a method of comparing the first instruction loaded to the second memory with the first instruction stored in the first memory based on the set mode based on the first instruction being identified as undecodable among the plurality of instructions.

8. A method of controlling a display apparatus comprising a first memory configured to store a plurality of instructions to execute a program, and a second memory, the method comprising:
loading the plurality of instructions stored in the first memory to the second memory, based on execution of the program;
sequentially fetching and decoding the plurality of instructions loaded to the second memory; and
while sequentially fetching and decoding the plurality of instructions, based on a first instruction among the plurality of instructions being identified as undecodable, creating a clone corresponding to the plurality of instructions;
identifying whether the clone matches the plurality of instructions loaded to the second memory; and
reloading the plurality of instructions stored in the first memory to the second memory when there is a mismatch.

9. The method according to claim 8, further comprising reloading a line portion corresponding to the first instruction from the first memory to the second memory, based on the first instruction being identified as undecodable among the plurality of instructions.

10. The method according to claim 8, further comprising stopping executing the program based on the clone matching the plurality of instructions loaded to the second memory.

11. The method according to claim 8, further comprising sequentially carrying out a plurality of exception handling operations, which comprises reloading the stored first instruction to the second memory, based on the first instruction being identified as undecodable among the plurality of instructions.

12. The method according to claim 8, further comprising stopping executing the program based on the first instruction being identified as undecodable among the plurality of instructions.

13. A method of controlling a display apparatus comprising a first memory configured to store a plurality of instructions to execute a program, and a second memory, the method comprising:
loading the plurality of instructions stored in the first memory to the second memory, based on execution of the program;
sequentially fetching and decoding the plurality of instructions loaded to the second memory;
reloading a first instruction among the plurality of instructions stored in the first memory to the second memory based on the first instruction being identified as undecodable;
fetching and decoding the reloaded first instruction;
receiving a user input;
setting one of a plurality of instruction examination modes based on the received user input; and
identifying a matching method between the first instruction loaded to the second memory and the first instruction stored in the first memory based on the set mode based on the first instruction being identified as undecodable among the plurality of instructions.

* * * * *